US 9,239,009 B2
United States Patent
Taguchi et al.

(10) Patent No.: US 9,239,009 B2
(45) Date of Patent: Jan. 19, 2016

(54) GAS TURBINE SYSTEM WITH COOLING FLUID GENERATOR

(75) Inventors: Hidetoshi Taguchi, Osaka (JP);
Fumitoshi Nishiwaki, Hyogo (JP); Kou Komori, Nara (JP); Tomoichiro Tamura, Osaka (JP); Subaru Matsumoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 972 days.

(21) Appl. No.: 13/390,663

(22) PCT Filed: Jun. 1, 2011

(86) PCT No.: PCT/JP2011/003089
§ 371 (c)(1),
(2), (4) Date: Feb. 15, 2012

(87) PCT Pub. No.: WO2011/152049
PCT Pub. Date: Dec. 8, 2011

(65) Prior Publication Data
US 2012/0137651 A1     Jun. 7, 2012

(30) Foreign Application Priority Data
Jun. 3, 2010   (JP) ................... 2010-128070

(51) Int. Cl.
*F02C 6/18*   (2006.01)
*F02C 7/224*  (2006.01)
*F02C 7/08*   (2006.01)

(52) U.S. Cl.
CPC . *F02C 7/224* (2013.01); *F02C 6/18* (2013.01); *F02C 7/08* (2013.01); *F05D 2240/40* (2013.01); *Y02E 20/14* (2013.01)

(58) Field of Classification Search
CPC ............... F02C 6/04; F02C 6/08; F02C 6/18; F02C 6/20; F02C 7/08; F02C 7/185; F02C 7/224; F02C 3/13; F02C 7/143
See application file for complete search history.

(56) References Cited

U.S. PATENT DOCUMENTS

| 5,392,595 | A | 2/1995 | Glickstein et al. |
| 5,755,089 | A | 5/1998 | Vanselow |
| 6,415,595 | B1 | 7/2002 | Wilmot, Jr. et al. |
| 6,718,750 | B2 * | 4/2004 | Shibata et al. ............. 60/39.511 |

(Continued)

FOREIGN PATENT DOCUMENTS

| CN | 1143993 | 2/1997 |
| CN | 100504054 C | 6/2009 |

(Continued)

*Primary Examiner* — Arun Goyal
(74) *Attorney, Agent, or Firm* — Hamre, Schumann, Mueller & Larson, P.C.

(57) ABSTRACT

A gas turbine system (1A) includes a gas turbine unit (2) and a cooling fluid generator (5). The gas turbine unit (2) includes a first compressor (21) and a first expansion turbine (23) coupled to each other by a first shaft (22), a combustor (26), and a fuel tank (30). A fuel held in the fuel tank (30) circulates through a fuel circulation passage (31). A working fluid that has a pressure increased by the first compressor (1) is extracted from the gas turbine unit (2). The cooling fluid generator (5) includes a cooler (55) for cooling, with the fuel flowing through the fuel circulation passage (31), the working fluid that has been extracted from the gas turbine unit (2), and a second expansion turbine (53) for expanding the working fluid that has flowed out of the cooler (55).

14 Claims, 6 Drawing Sheets

(56) References Cited

U.S. PATENT DOCUMENTS

| | | |
|---|---|---|
| 6,776,002 B1 | 8/2004 | Ho |
| 6,906,432 B2 * | 6/2005 | Belokon et al. ............... 290/52 |
| 6,939,392 B2 * | 9/2005 | Huang et al. ................... 95/46 |
| 7,596,939 B2 * | 10/2009 | Kataoka et al. ........... 60/39.281 |
| 7,624,592 B2 * | 12/2009 | Lui et al. ...................... 62/402 |
| 2006/0185368 A1 | 8/2006 | Takahashi et al. |
| 2008/0066618 A1 | 3/2008 | Olsen et al. |
| 2010/0170262 A1 * | 7/2010 | Kaslusky et al. ............. 60/778 |
| 2011/0239659 A1 * | 10/2011 | Lior ............................. 60/783 |

FOREIGN PATENT DOCUMENTS

| | | |
|---|---|---|
| JP | 6-087640 | 12/1994 |
| JP | 7-091279 | 4/1995 |
| JP | 2004-324639 | 11/2004 |
| JP | 2007-505260 | 3/2007 |
| JP | 4324716 | 6/2009 |
| WO | 2005/025718 | 3/2005 |

* cited by examiner

GAS TURBINE SYSTEM WITH COOLING FLUID GENERATOR

TECHNICAL FIELD

The present invention relates to a gas turbine system including a gas turbine unit.

BACKGROUND ART

Conventionally, as a gas turbine system including a gas turbine unit, there has been known a cogeneration system that produces hot water, etc. by utilizing the waste heat caused when the gas turbine unit generates electricity. In recent years, there also has been proposed a gas turbine system that directly produces hot water and cold air by using a gas turbine unit without generating electricity. For example, Patent Literature 1 discloses a gas turbine system 100 as shown in FIG. 6.

The gas turbine system 100 includes a first compressor 101 and a first expansion turbine 102 coupled to each other by a shaft, a combustor 103, a regenerative heat exchanger 104, and a heat exchanger 123 for hot water, as elements constituting a gas turbine unit. The first compressor 101 compresses air taken from the atmosphere. The air discharged from the first compressor 101 passes through the regenerative heat exchanger 104, and then flows in to the combustor 103. A fuel is injected into the combustor 103 and combusted therein. A combustion gas generated in the combustor 103 heats the air to flow into the combustor 103 in the regenerative heat exchanger 104, and then flows into the first expansion turbine 102 to be expanded therein. The first expansion turbine 102 creates power from the expanding combustion gas as a rotation torque to drive the first compressor 101. The combustion gas discharged from the first expansion turbine 102 is utilized, in the heat exchanger 123 for hot water, as a heat source for producing hot water, and then exhausted into the atmosphere.

The gas turbine system 100, the gas turbine unit has no power generator. Thus, in order to start the gas turbine unit, the gas turbine system 100 is provided with a reciprocating type compressor 105 for supplying compressed air to the combustor 103 at the time of starting.

Furthermore, the gas turbine system 100 has a configuration to extract, from the gas turbine unit, the air compressed in the first compressor 101 and lower the temperature of this extracted air (so-called bleed air) so as to produce cold air. Specifically, the gas turbine system 100 is provided with a first heat exchanger 121 for cooling the air extracted from the gas turbine unit with cold water, a second compressor 111 for compressing the air that has flowed out of the first heat exchanger 121, a second heat exchanger 122 for cooling the air discharged from the second compressor 111 with cold water, and a second expansion turbine 112 for expanding the air that has flowed out of the second heat exchanger 122. The second expansion turbine 112 is coupled to the second compressor 111 by a shaft, and creates power from the expanding air as a rotation torque to drive the second compressor 111. A moisture separator 113 for separating moisture from the air is provided between the second heat exchanger 122 and the second expansion turbines 112. The water heated by cooling the air in the first heat exchanger 121 and the second heat exchanger 122 is supplied to the heat exchanger 123 for hot water in the gas turbine unit.

CITATION LIST

Patent Literature

PTL 1: JP 4324716 B

SUMMARY OF INVENTION

Technical Problem

The gas turbine system 100 disclosed in Patent Literature 1 produces cold air. Accordingly, it is conceivable to incorporate the gas turbine system 100 in a vehicle, such as an automobile, to, for example, perform interior cooling of the vehicle by utilizing the cold air generated in the gas turbine system 100. However, since the gas turbine system 100 disclosed in Patent Literature 1 was developed on the assumption that it is placed in an environment where abundant cold water is available, it needs additional equipment for holding cold water in the case of being incorporated in a vehicle. Thus, the gas turbine system 100 is not suitable to be incorporated in a vehicle that is required to be downsized and light-weight.

In view of the foregoing, the present invention is intended to provide a gas turbine system suitable to be incorporated in a vehicle.

Solution to Problem

In order to solve the above-mentioned problem, the present invention provides a gas turbine system including: a gas turbine unit including a first compressor for compressing a working fluid, a combustor in which a fuel is injected into the working fluid discharged from the first compressor so as to be combusted, a first expansion turbine for expanding a combustion gas generated in the combustor, the first expansion turbine being coupled to the first compressor by a first shaft, and a fuel tank for holding the fuel to be supplied to the combustor; a fuel circulation passage that allows the fuel held in the fuel tank to circulate therethrough; and a cooling fluid generator including a cooler for cooling, with the fuel flowing through the fuel circulation passage, the working fluid that has a pressure increased by the first compressor and that has been extracted from the gas turbine unit, and a second expansion turbine for expanding the working fluid that has flowed out of the cooler.

Advantageous Effects of Invention

In the above-mentioned configuration, by cooling the working fluid by using the fuel, it is possible to construct a system that does not require input except for the working fluid. Therefore, the present invention can realize a gas turbine system suitable to be incorporated in a vehicle.

DESCRIPTION OF EMBODIMENTS

Hereinafter, embodiments of the present invention are described in detail with reference to the drawings.

Embodiment 1

Figure 1:
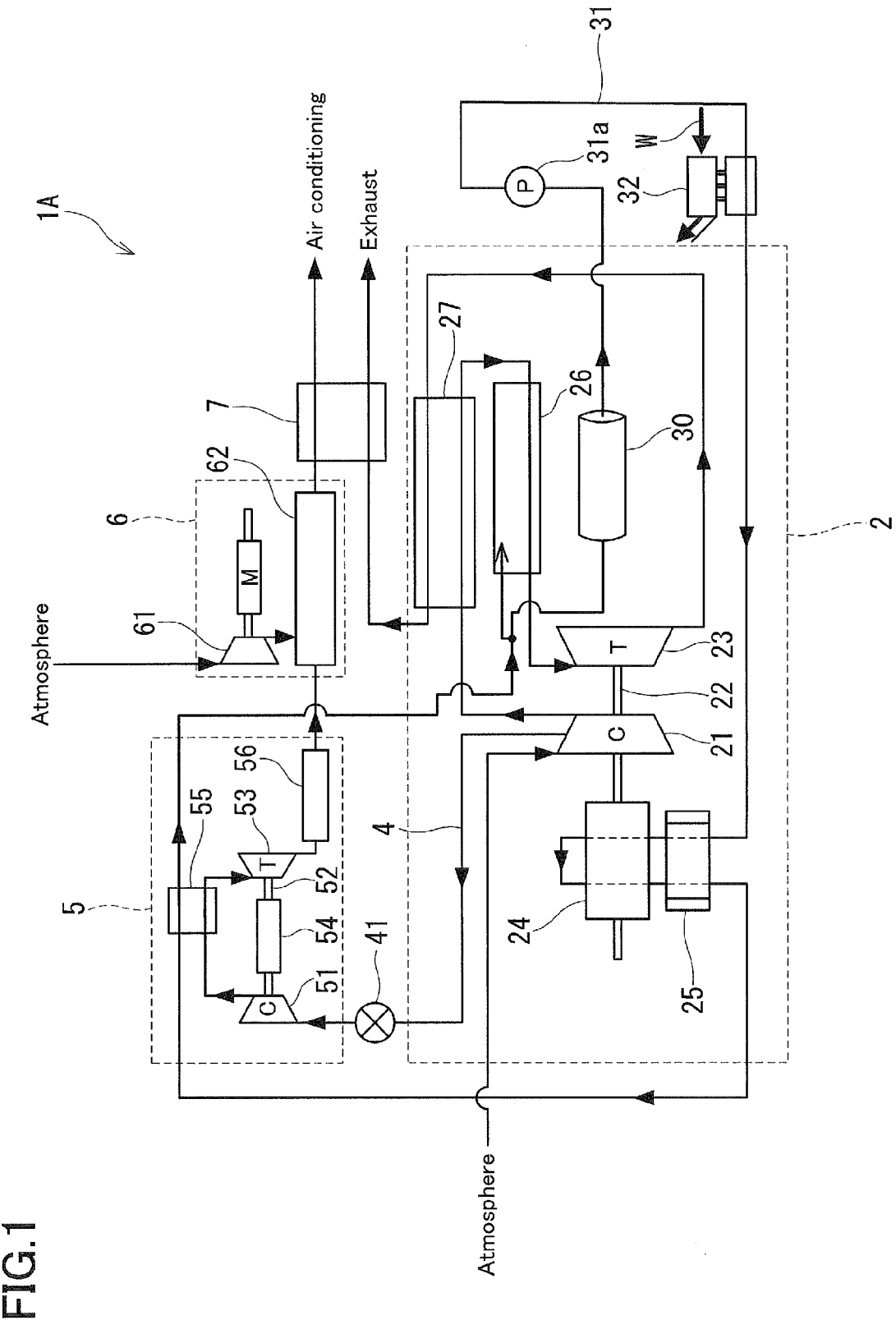
FIG. 1 is a configuration diagram of a gas turbine system according to Embodiment 1 of the present invention.

FIG. 1 shows a gas turbine system 1A according to Embodiment 1 of the present invention. The gas turbine system 1A is to be incorporated in a vehicle (not shown), and includes a gas turbine unit 2, a cooling fluid generator 5, an air conditioning unit 6, and a heat exchanger 7 serving also as a silencer. In the present embodiment, air is used as a working fluid for the gas turbine unit 2 and the cooling fluid generator 5, and the cold air generated in the cooling fluid generator 5 is utilized directly for air conditioning.

The gas turbine unit 2 includes a first compressor 21 and a first expansion turbine 23 coupled to each other by a first shaft 22, a combustor 26, and a regenerative heat exchanger 27. In the present embodiment, the regenerative heat exchanger 27 is provided from the viewpoint of enhancing the thermal efficiency of the gas turbine unit 2. However, the regenerative heat exchanger 27 may be omitted. The gas turbine unit 2 further includes a power generator 24 coupled to the first shaft 22, a control circuit 25 that is connected to the power generator 24 and includes an inverter, etc., and a fuel tank 30 for holding a fuel to be supplied to the combustor 26.

The first compressor 21 draws the air taken from the atmosphere and compresses it. The power generator 24 is used as a motor at the time of starting, and rotates the first shaft 22 to drive the first compressor 21. The high pressure air discharged from the first compressor 21 flows into the regenerative heat exchanger 27 and is heated therein with after-mentioned combustion gas to have a further increased temperature, and then flows into the combustor 26.

In the combustor 26, the fuel from the fuel tank 30 is injected into the high pressure air through an after-mentioned fuel circulation passage 31, and an air-fuel mixture is formed. The fuel injected into the combustor 26 is fired by a spark electrode (not shown) and combusted. This allows the air-fuel mixture to be a high temperature combustion gas while keeping its pressure substantially.

The combustion gas generated in the combustor 26 flows into the first expansion turbine 23 and is expanded therein to have a pressure reduced to around an atmospheric pressure. The first expansion turbine 23 creates power from the expanding combustion gas as a rotation torque to drive the first compressor 21 and provide the power generator 24 with a redundant power. Thereby, the power generator 24 generates electricity. The combustion gas discharged from the first expansion turbine 23 flows into the regenerative heat exchanger 27. In the regenerative heat exchanger 27, heat is exchanged between the combustion gas and the high pressure air to flow into the combustor 26, so that the temperature of the combustion gas is lowered. The combustion gas that has flowed out of the regenerative heat exchanger 27 flows into the heat exchanger 7 and is cooled therein with after-mentioned adjusted air so as to have a further lowered temperature, and then exhausted into the atmosphere.

Both ends of the fuel circulation passage 31 are connected to the fuel tank 30. The fuel held in the fuel tank 30 is circulated through the fuel circulation passage 31 that is provided with a pressure pump 31a. In the present embodiment, a liquid fuel is held in the fuel tank 30. However, a gaseous fuel may be held in the fuel tank 30. Use of a liquid fuel has the advantage of reducing the volumetric capacity of the fuel tank 30. Use of a gaseous fuel has the advantage of simplifying a mechanism for injecting the fuel into the combustor 26. As the liquid fuel, an existing petroleum-derived fuel, such as gasoline and diesel oil (particularly a second-generation bio diesel fuel), that has been used conventionally may be used. However, an alcohol fuel, such as methanol and ethanol, or a alcohol-based composite fuel containing the alcohol fuel is preferred. As the gaseous fuel, CNG (Compressed Natural Gas), propane (LPG, standing for Liquefied Petroleum Gas), MTBE (Methyl Tertiary Butyl Ether), and hydrogen may be used, for example.

Table 1 shows the type-dependent properties of the abovementioned liquid fuels and gaseous fuels (this is cited from: American Petroleum Institute (API), Alcohols and Ethers, Publication No. 4261, 3rd ed. (Washington, D.C., June 2001), Table 2; Petroleum Product Surveys, Motor Gasoline, Summer 1986, Winter 1986/1987. National Institute for Petroleum and Energy Research; and American Petroleum Institute (API), Alcohols and Ethers, Publication No. 4261, 3rd ed. (Washington, D.C., June 2001), Table B-1. In the citation, the values are converted from ft/lb unit into SI unit.)

TABLE 1

| | | Fuel type | | | | |
|---|---|---|---|---|---|---|
| | | Gasoline | | No2 Diesel oil | | Methanol |
| Chemical formula | | C4 | C12 | C8 | C25 | $CH_3OH$ |
| Molecular weight | | 100 | 105 | 200 | 200 | 32.04 |
| Specific weight | | 0.72 | 0.780 | 0.850 | 0.850 | 0.796 |
| Density | $kgf/m^3$ | 720 | 780 | 849 | 849 | 795 |
| Boiling point | °C. | 26.7 | 225 | 180 | 340 | 65.0 |
| Vapor pressure (37.8° C.) | MPa | 0.00563 | 0.0106 | 0.000141 | 0.000141 | 0.00324 |
| Lower heating value | KJ/kg | 43401 | 43401 | 42746 | 42746 | 20072 |
| Higher heating value | KJ/kg | 46488 | 46488 | 45718 | 45718 | 22860 |
| Evaporation heat (15.8° C.) | KJ/kg | 349 | 349 | 232 | 232 | 1176 |

| | | Fuel type | | | | |
|---|---|---|---|---|---|---|
| | | Ethanol | MTBE | Propane | CNG | Hydrogen |
| Chemical formula | | $C_2H_5OH$ | $(CH_3)_3COCH_3$ | $C_3H_8$ | $CH_4C_2H_6$ | $H_2$ |
| Molecular weight | | 46.07 | 88.15 | 44.1 | 16.04 | 2.02 |
| Specific weight | | 0.794 | 0.744 | 0.508 | 0.424 | 0.07 |
| Density | $kgf/m^3$ | 793 | 742 | 506 | 128 | — |
| Boiling point | °C. | 77.8 | 55.0 | −42.2 | −164 | −253 |
| Vapor pressure (37.8° C.) | MPa | 0.00162 | 0.00549 | 0.146 | 1.69 | — |

TABLE 1-continued

| | | | | | | |
|---|---|---|---|---|---|---|
| Lower heating value | KJ/kg | 26923 | 35070 | 46246 | 47089 | 121348 |
| Higher heating value | KJ/kg | 29816 | 37917 | 50183 | 52169 | 138984 |
| Evaporation heat (15.8° C.) | KJ/kg | 920 | 390 | 449 | 509 | 446 |

The fuel circulation passage 31 serves to form, outside the gas turbine unit 2, a route through which the fuel flows. The fuel circulation passage 31 passes through the cooling fluid generator 5. Usually, the fuel in the fuel tank 30 has a temperature comparable to an atmospheric temperature. This fuel is used as a heat medium for removing heat in the cooling fluid generator 5. Thus, the fuel circulation passage 31 is provided with a fuel cooler 32 for cooling the fuel flowing through the fuel circulation passage 31 as a means to prevent the fuel from being overheated. The fuel cooler 32 in the present embodiment is configured to cool the fuel with wind W generated by travelling of the vehicle. Preferably, the fuel cooler 32 is placed at a position immediately downstream of the fuel tank 30 or immediately downstream of the pressure pump 31a, to which the wind W is introduced easily. The fuel cooler 32 may be omitted depending on the capacity of the fuel tank 30.

In the present embodiment, the fuel circulation passage 31 is configured to pass through the control circuit 25 as well as the power generator 24. Thus, the control circuit 25 and the power generator 24 are cooled with the fuel flowing through the fuel circulation passage 31. Preferably, the fuel cooler 32 is disposed on an upstream side of the power generator 24 and the control circuit 25 as in the illustrated example.

The cooling fluid generator 5 includes a second compressor 51 and a second expansion turbine 53 coupled to each other by a second shaft 52, a cooler 55, and a moisture separator 56. The cooling fluid generator 5 further includes a power generator 54 coupled to the second shaft 52.

One end of a bleed air passage 4 for extracting from the gas turbine unit 2 the air having a pressure increased by the first compressor 21 is connected to the second compressor 51. In the present embodiment, the other end of the bleed air passage 4 is connected to an intermediate pressure position of the first compressor 21 so that the air being compressed in the first compressor 21 is supplied to the second compressor 51 through the bleed air passage 4.

The bleed air passage 4 is provided with a flow control valve 41. The flow control valve 41 is opened when the temperature of the air that has been extracted from the gas turbine unit 2 through the bleed air passage 4 and has a pressure increased by the first compressor 21 (hereinafter simply referred to as a "bleed air") reaches a specified temperature determined based on the pressure ratio of the second compressor 51.

The second compressor 51 draws the bleed air and compresses it. The power generator 54 is used as a motor at the time of starting, and rotates the second shaft 52 to drive the second compressor 51. The high pressure air discharged from the second compressor 51 flows into the cooler 55. In the cooler 55, heat is exchanged between the high pressure air and the fuel flowing through the fuel circulation passage 31 so that the high pressure air is cooled with the fuel.

The high pressure air that has flowed out of the cooler 55 flows into the second expansion turbine 53 and is expanded therein to have a pressure reduced to around an atmospheric pressure. This expansion in the second expansion turbine 53 produces cold air (cooling fluid). The second expansion turbine 53 creates power from the expanding air as a rotation torque to drive the second compressor 51 and provide the power generator 54 with a redundant power. Thereby, the power generator 54 generates electricity. Under the operating condition in which there is no redundant power, it also is possible to use the power generator 54 merely as a motor. The air discharged from the second expansion turbine 53 passes through the moisture separator 56, and then is sent to the air conditioning unit 6. The moisture separator 56 separates moisture from the air discharged from the second expansion turbine 53.

The air conditioning unit 6 includes a mixer 62 connected to the second expansion turbine 53 via the moisture separator 56, and a blower 61 for taking air from the atmosphere and supplying it to the mixer 62. The air discharged from the second expansion turbine 53 is adjusted to have a desired temperature by being mixed, in the mixer 62, with the air supplied from the blower 61. This adjusted air is sent to the heat exchanger 7. However, during interior cooling, the adjusted air adjusted, in the air conditioning unit 6, to have a temperature in accordance with a temperature required for air conditioning may be supplied directly to the inside of the vehicle (not shown) without passing through the heat exchanger 7.

The heat exchanger 7 exchanges heat between the adjusted air that has flowed out of the mixer 62 and the above-mentioned combustion gas that has flowed out of the regenerative heat exchanger 27 so as to heat the adjusted air that has flowed out of the mixer 62 to have a temperature suitable for air conditioning. The air heated in the heat exchanger 7 is supplied to the inside of the vehicle (not shown).

As described above, in the present embodiment, the mixer 62 of the air conditioning unit 6 and the heat exchanger 7 constitute a temperature adjuster for adjusting the temperature of the air discharged from the second expansion turbine 53.

When the operation of the gas turbine system 1A described above is viewed from the fuel side, the fuel with a flow rate sufficiently higher than the flow rate necessary for the combustion in the combustor 26 is allowed to flow into the fuel circulation passage 31 by the pressure pump 31a. The flow rate of the fuel flowing through the fuel circulation passage 31 is determined based on the amount of heat required for cooling in the control circuit 25, the power generator 24 and the cooler 55 so that the temperature of the fuel is increased by an appropriate value. The fuel flowing through the fuel circulation passage 31 is heated in the control circuit 25 and the power generator 24 in the course of being sent from the fuel tank 30 to the cooler 55, and heated further in the cooler 55, and then returned to the fuel tank 30. A part of the fuel flowing through the fuel circulation passage 31 is supplied to the combustor 26 in the course of returning from the cooler 55 to the fuel tank 30.

In the present embodiment, a part of the fuel flowing through the fuel circulation passage 31 is supplied to the combustor 26, and thus the pressure pump 31a increases the pressure of the fuel to a pressure that enables the fuel to be injected. However, it also is possible to provide a jet pump to a flow passage through which the fuel is guided from the fuel circulation passage 31 to the combustor 26 so as to reduce the value by which the pressure pump 31a increases the pressure of the fuel.

The combustion of the fuel in the combustor 26 occurs after the temperature of the air-fuel mixture composed of the fuel and the air reaches a temperature suitable for the combustion. In the present embodiment, since the fuel heated in the control circuit 25, the power generator 24 and the cooler 55 is supplied to the combustor 26, the amount of heat necessary to heat the air-fuel mixture to an appropriate temperature in the combustor 26 can be reduced by the value of the temperature increase in the fuel heated.

Next, operating points in the case of using ethanol as the fuel are described as examples. The precondition is that the atmospheric temperature is 15° C., the atmospheric pressure is 0.103 MPa, and the type-dependent properties of ethanol shown in Table 1 are used.

Although the fuel has chemical energy, this energy cannot be utilized as it is. Thus, the fuel is combusted so that the chemical energy is converted into thermal energy, and this thermal energy is utilized effectively.

The amount of heat measured when a unit quantity (1 kg, 1 $m^3$ or 1 L) of a fuel placed in a constant state (at 1 atmosphere and 25° C., for example) is combusted completely with a sufficient amount of dry air and the combustion gas is cooled to the original temperature (25° C. in this case) is referred to as a calorific value.

A calorific value including a condensation latent heat obtained when the water vapor produced in a combustion gas is condensed is referred as a higher calorific value. A calorific value in the case where the water vapor remains as it is and no condensation latent heat is included therein is referred to as a lower calorific value. The lower calorific value is obtained by subtracting the condensation latent heat of the water vapor from the higher calorific value measured by a calorimeter. The lower calorific value is calculated by (Formula 1) below. The thermal efficiency on the side of the power generator of the gas turbine unit 2 described hereinafter is calculated from the lower calorific value excluding the condensation latent heat of the water vapor.

Lower calorific value=Higher calorific value−Condensation latent heat of water vapor×Amount of water vapor    (Formula 1)

In the gas turbine unit 2, the outlet temperature of the first compressor 21 is about 190° C., the primary-outlet temperature of the regenerative heat exchanger 27 is about 810° C., the outlet temperature of the combustor 26 is about 1200° C., the outlet temperature of the first expansion turbine 23 is about 910° C., and the secondary-outlet temperature of the regenerative heat exchanger 27 is about 340° C. When the pressure is decreased from about 0.38 MPa to about 0.11 MPa in the first expansion turbine 23, 18 kW of electricity is generated.

In the cooling fluid generator 5, the bleed air temperature is about 100° C., the outlet temperature of the second compressor 51 is about 160° C., the outlet temperature of the cooler 55 is about 65° C., the outlet temperature of the second expansion turbine 53 is about 3.0° C. When the pressure is decreased from about 0.33 MPa to about 0.12 MPa in the second expansion turbine 53, 1.6 kW of electricity is generated.

The fuel is pumped at 0.4 MPa. The fuel has a temperature of about 25° C. at the inlet of the cooler 55 and a temperature of about 32° C. at the outlet of the cooler 55.

The above-mentioned operating points are calculation results in the case of using ethanol as the liquid fuel. However, it can be changed to a different fuel.

Usually, a gas turbine system is designed so that the required power (the amount of electricity generated by the power generator 24) is constant. In the case of using a different fuel other than ethanol, the amount of electricity generated by the power generator 24 is maintained by controlling the flow rate of the fuel to be supplied to the combustor 26 so that the calorific value of the gas turbine unit 2 is equal to the calorific value in the case of using ethanol. For example, in the case where the fuel is changed from ethanol to diesel oil (C25), the amount of the fuel to be supplied is controlled so as to be 0.70 times of that in the case of using ethanol, based on the conversion of the lower calorific value in Table 1.

As described above, it is possible to maintain the amount of electricity generated by the power generator 24 and the temperature of the bleed air to the cooling fluid generator 5 by setting the calorific value per unit time of the fuel supplied to the gas turbine unit 2 to be constant and setting the amount of the atmosphere drawn into the gas turbine unit 2 to be constant.

The temperature control in cooling the bleed air in the cooling fluid generator 5 is performed by controlling the heat transmissibility by the flow rate of the fuel circulating through the cooling fluid generator 5.

Next, based on the above-mentioned study results, the capacities required for each element constituting an electric vehicle and a refrigerator truck (at a moderate temperature of −5 to 5° C.) are studied with reference to examples. Ethanol is used as the fuel.

Design Example 1

Electric Vehicle

Interior cooling capacity: Amount of air blow 350 $m^3$/h, 4500 W

Interior heating capacity: Amount of air blow 450 $m^3$/h, 5000 W

Rated output of power generator: 15 kW

In Design Example 1, the rated output of the power generator is determined to be 15 kW under the conditions that a secondary battery with a power of 16 kWh is mounted on an electric vehicle (equivalent to a 1500 to 2000 cc passenger car) and this secondary battery is charged within about 1 hour. As for the air conditioning capacity, the amount of air blow is 350 $m^3$/h in interior cooling and the interior cooling capacity is 4500 W, and the amount of air blow is 450 $m^3$/h in interior heating and the interior heating capacity is 5000 W.

In this case, the flow rate of the working fluid in the gas turbine unit 2 (the flow rate of the working fluid drawn into the first compressor 21) is 0.135 kg/sec at the minimum.

When the above-mentioned results are applied to a truck with a total piston displacement of 3000 cc, the rated output of the power generator is almost doubled to 30 kW, and the flow rate of the working fluid in the gas turbine unit 2 (the flow rate of the working fluid drawn into the first compressor 21) is 0.27 kg/sec at the minimum.

The above-mentioned study results reveal that the gas turbine system 1A in the present embodiment can be applied to electric vehicles.

Design Example 2

Refrigerator Truck at Moderate Temperature

Refrigerating capacity: 0° C., 3000 W
Rated output of power generator: 30 kW

In Design Example 2, use of the gas turbine system for air conditioning in a cool box of a refrigerator truck is studied. As mentioned above, the air conditioning capacity (refrigerating capacity) of the refrigerator truck in Design Example 2 is smaller than that of the passenger car in Design Example 1. This is because the cool box has greater heat insulation property than that of the passenger car, and is not affected by the amount of solar radiation as it has no window.

Assuming that the refrigerator truck is equivalent to a truck with a total piston displacement of 3000 cc, the truck is under severer travel condition than that of the passenger car considering its loading capacity, and is presumed to consume a larger amount of electric power. Thus, the output of electricity generation needs to be increased as well. In this case, it is possible to apply the gas turbine system 1A in the present embodiment to the refrigerator truck by setting the rated output of power generator to 30 kW and setting the flow rate of the working fluid in the gas turbine unit 2 (the flow rate of the working fluid drawn into the first compressor 21) to 0.27 kg/sec.

As described above, in the gas turbine system 1A in the present embodiment, the bleed air extracted from the gas turbine unit 2 is cooled with the fuel, which makes it possible to generate cold energy with a small system. Particularly, in the present embodiment, since the gas turbine unit 2 includes the power generator 24, and the temperature of the air discharged from the second expansion turbine 53 is adjusted by the temperature adjuster (the mixer 62 and the heat exchanger 7), it is possible to perform air conditioning while generating electricity. Therefore, when the gas turbine system 1A is incorporated in, for example, an electric vehicle, both of the batter charge and the air conditioning can be realized.

Figure 2:
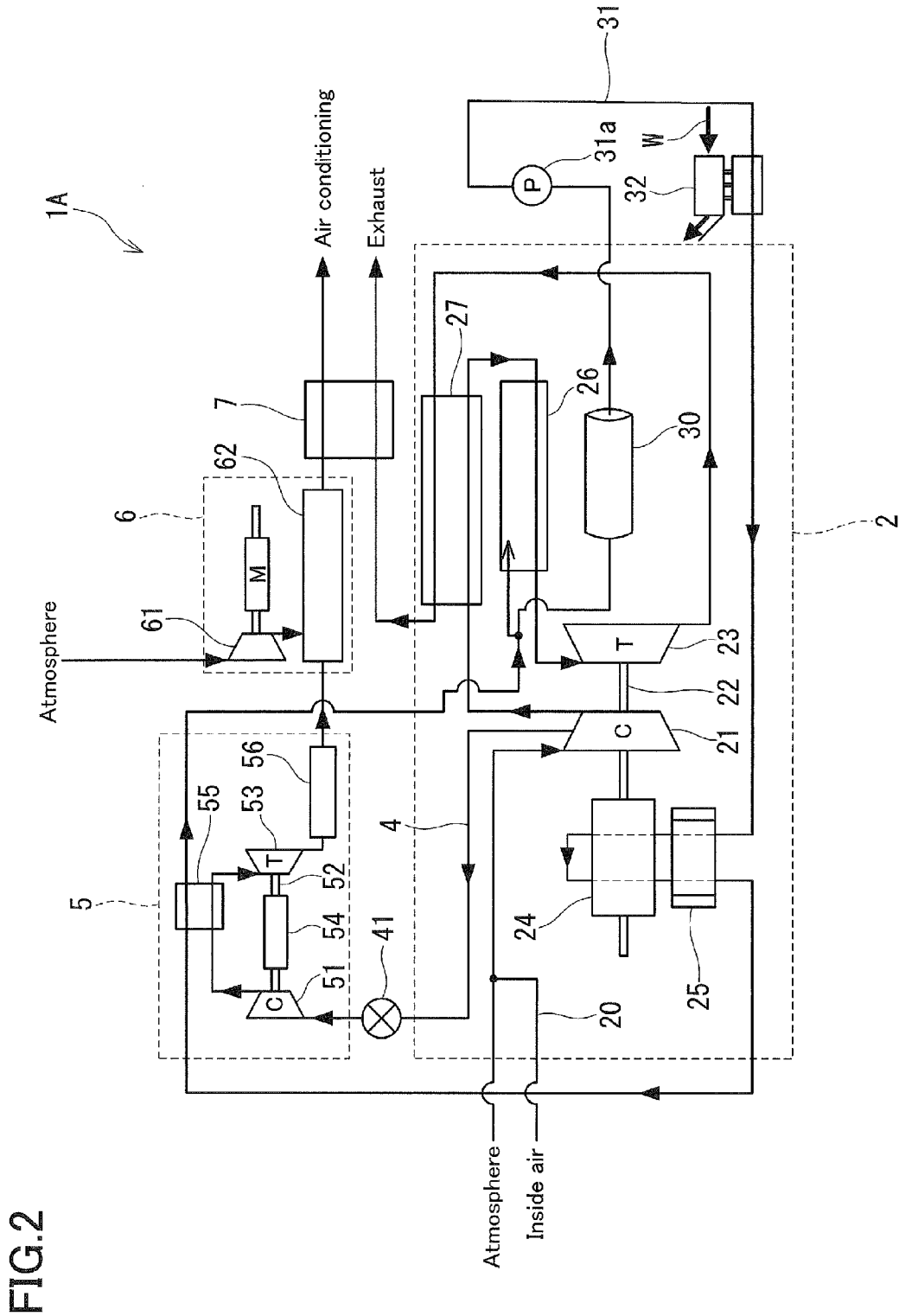
FIG. 2 is a configuration diagram of a modification of the gas turbine system.

For the electric vehicle, for example, it is proposed to heat the air inside the vehicle while circulating it in order to perform interior heating efficiently. However, since the air inside the vehicle contains moisture derived from a passenger, windows may be fogged when the interior heating is performed while the air is circulated. In contrast, in the present embodiment, since the air dehumidified by the moisture separator 56 is supplied to the inside of the vehicle, it is possible to prevent the fogging of the windows even during the interior heating and ensure the field of view for the driver. As shown in FIG. 2, the gas turbine unit 2 may be provided with a flow passage 20 for taking the air from the inside of the vehicle so that the first compressor 21 draws an air mixture in which the air from the atmosphere and the air from the inside of the vehicle are mixed. Such a configuration makes it possible to perform the interior heating while dehumidifying the air inside the vehicle.

Moreover, in FIG. 2, by providing a flow control valve (not shown) to a flow passage for taking the atmosphere outside the car into the first compressor 21 and providing a flow control valve (not shown) to the flow passage 20, it is possible to adjust the flow rate of the atmosphere taken from the outside of the car and the flow rate of the air taken from the inside of the vehicle. Such a configuration makes it possible to adjust the openings of these two flow control valves in accordance with the atmospheric temperature and the temperature and humidity inside the vehicle so as to dehumidify quickly the air in the vehicle.

Embodiment 2

Figure 3:
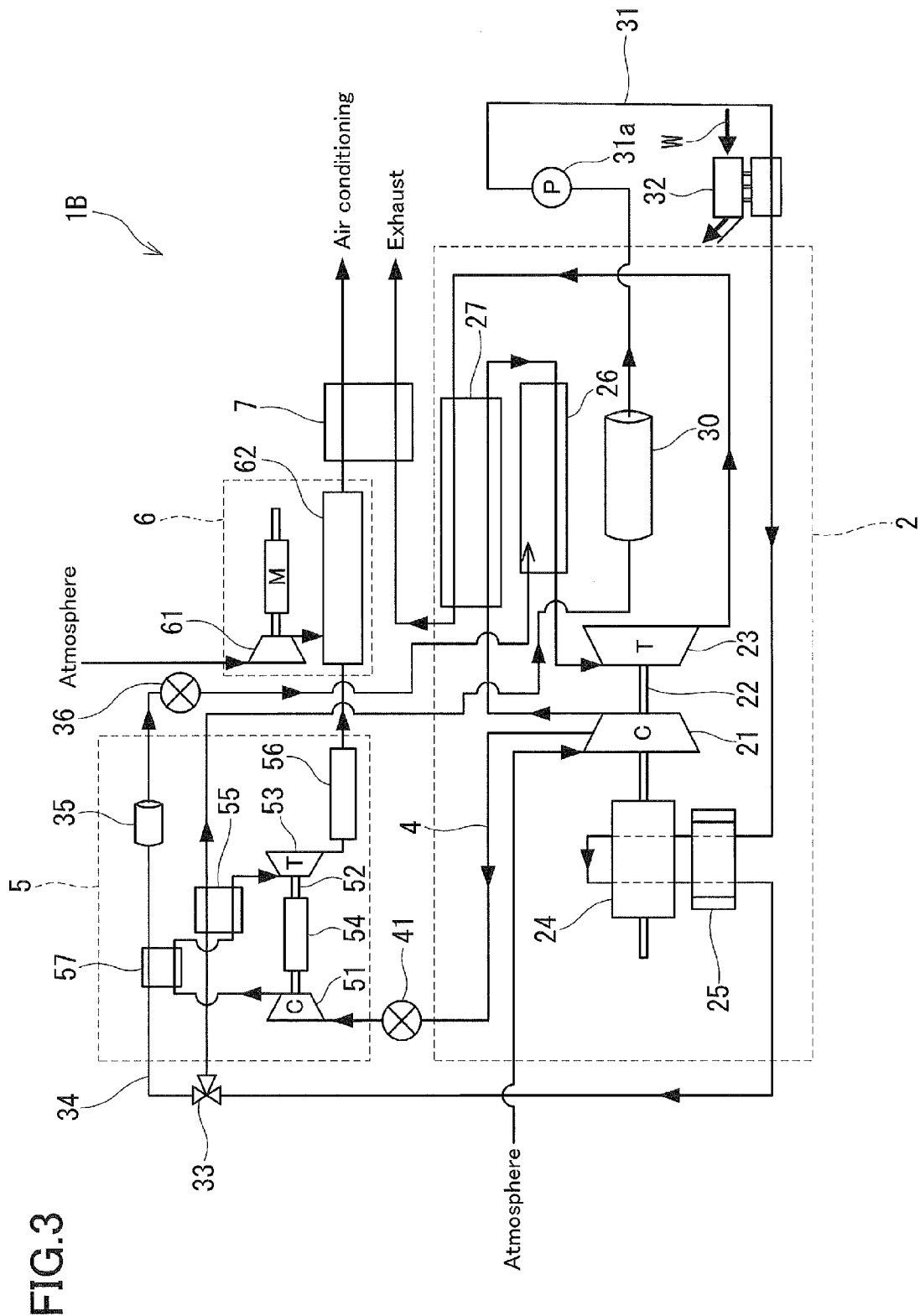
FIG. 3 is a configuration diagram of a gas turbine system according to Embodiment 2 of the present invention.

Next, with reference to FIG. 3, a gas turbine system 1B according to Embodiment 2 of the present invention is described. In the present embodiment, the same components as those in Embodiment 1 are designated by the same reference numerals, and the descriptions thereof are omitted.

In the present embodiment, the liquid fuel is held in the fuel tank 30, and the fuel circulation passage 31 is provided with a branch passage 34 that branches from the fuel circulation passage 31 on an upstream side of the cooler 55 and that reaches the combustor 26. Specifically, the fuel circulation passage 31 is provided with a distributing valve 33 on the upstream side of the cooler 55, and an upstream end of the branch passage 34 is connected to the distributing valve 33.

As the fuel used in the present embodiment, a fuel having a low boiling point under an atmospheric pressure and having a high steam pressure when being superheated is preferred. Specifically, an alcohol fuel, such as methanol and ethanol, or an alcohol-based composite fuel containing the alcohol fuel is preferred from the view point of the thermal efficiency of the gas turbine unit 2, the pressure ratio of the second compressor 51, and the superheat temperature necessary to obtain a sufficient fuel vapor pressure. However, an existing petroleum-derived fuel, such as gasoline and diesel oil, that has been used conventionally may be used as long as it satisfies the above-mentioned selection conditions. However, the alcohol fuel or the alcohol-derived composite fuel is particularly preferable in the present embodiment because these fuels have a greater ability to cool the bleed air as they have a larger evaporation heat than that of the existing petroleum-derived fuel.

Moreover, the cooling fluid generator 5 is provided, on the upstream side of the cooler 55, with a vaporizer 57 for vaporizing the fuel flowing through the branch passage 34 with the air discharged from the second compressor 51.

Furthermore, the branch passage 34 is provided, on a downstream side of the vaporizer 57, with a pressure accumulator 35 and a flow control valve 36 in this order.

Next, the operation of the gas turbine system 1B is described. The operation of the gas turbine unit 2 is the same as that described in Embodiment 1.

The operation of the cooling fluid generator 5 is the same as that described in Embodiment 1, except for the following two points. Firstly, the air discharged from the second compressor 51 flows into the vaporizer 57 and is cooled therein by exchanging heat with the fuel flowing through the branch passage 34. Secondly, the flow control valve 41 is opened when the temperature of the bleed air reaches a specified temperature determined based on the pressure ratio of the second compressor 51 and the evaporating temperature of the fuel.

The distributing valve 33 distributes the fuel flowing through the fuel circulation passage 31 to a circulation side to return to the fuel tank 30 through the cooler 55, and to a combustion side to be supplied to the combustor 26 through the vaporizer 57. The flow rate of the fuel distributed to the combustion side is equivalent to or slightly higher than the flow rate necessary for the combustion in the combustor 26. The flow rate of the fuel distributed to the circulation side is not particularly limited and it can be high. The distribution ratio thus determined makes it possible to vaporize quickly the fuel with a low flow rate, and increase the pressure of the vapor to a superheated state and minimize the volumetric capacity necessary for the pressure accumulator 35.

The fuel distributed to the circulation side is heated in the cooler 55, and then returned to the fuel tank 30. On the other hand, the fuel distributed to the fuel side flows into the vaporizer 57. In the vaporizer 57, the fuel is vaporized by exchanging heat with the high pressure air discharged from the second compressor 51, and obtains a further increased temperature to reach a superheated state. In other words, the fuel lowers, by the evaporation heat, the temperature of the high pressure air discharged from the second compressor 51. The fuel that has flowed out of the vaporizer 57 is once kept in the pressure accumulator 35 and flows into the combustor 26 against the pressure in the combustor 26 due to the vapor pressure of the fuel itself, according to the setting of the flow control valve 36.

In a common gas turbine unit, the pressure of a fuel is increased to a pressure that enables the fuel to be injected by a pump or a compressor, and the fuel is supplied to a combustor, regardless of whether the fuel is a liquid fuel or a gaseous fuel. In contrast, in the gas turbine system 1B in the present embodiment, it is unnecessary to increase the pressure of the fuel to a pressure that enables the fuel to be injected by a pump, and it is possible to increase the pressure of the fuel to the pressure that enables the fuel to be injected by gasifying the fuel. That is, the heat emitted from the air in the vaporizer 57 of the cooling fluid generator 5 is used as the pressure source for injecting the fuel. Such a configuration makes it possible to inject the fuel with a simple device such as an on-off valve.

Next, operating points in the case of using ethanol (with a boiling point of 78° C. under an atmospheric pressure) as the fuel are described as examples. The precondition is that the atmospheric temperature is 15° C., the atmospheric pressure is 0.103 MPa, and the type-dependent properties of ethanol shown in Table 1 are used.

The operating points for the gas turbine unit 2 are the same as in Embodiment 1. The operating points for the cooling fluid generator 5 are the same as in Embodiment 1, except that the outlet temperature of the vaporizer 57 is about 120° C.

The fuel is pumped at 0.4 MPa. The fuel has a temperature of about 25° C. at the inlet of the cooler 55 and at the inlet of the vaporizer 57, a temperature of about 26° C. at the outlet of the cooler 55, and a temperature of about 120° C. at the outlet of the vaporizer 57. As for the distribution ratio, about 99% of the fuel is distributed to the circulation side and about 1% of the fuel is distributed to the combustion side.

As described above, the gas turbine system 1B in the present embodiment can achieve an output comparable to that of the gas turbine system 1A in Embodiment 1. Therefore, it is needless to say that the gas turbine system 1B can be applied to the electric vehicle and the refrigerator truck as in Design Example 1 and Design Example 2 described in Embodiment 1.

In the gas turbine system 1B in the present embodiment, since the bleed air extracted from the gas turbine unit 2 is cooled by utilizing the latent heat of the fuel, it is possible to use a smaller heat exchanger than in the case, such as in Embodiment 1 in which the gaseous fuel is used, where heat is exchanged between gases each having a low heat transfer coefficient.

Moreover, since the gas turbine system 1B is capable of supplying the vaporized fuel to the combustor 26 while holding the liquid fuel in the fuel tank 30, it is possible to obtain both of the advantage of the liquid fuel that allows the fuel tank 30 to have a reduced volumetric capacity and the advantage of the gaseous fuel that allows the mechanism for injecting the fuel into the combustor 26 to be simplified. Furthermore, in the present embodiment, the power of the pressure pump 31a can be smaller than in Embodiment 1 because it is unnecessary to increase the pressure of the fuel to a pressure that enables the fuel to be injected by the pressure pump 31a. For example, in the case where ethanol is used as the fuel, the power of the pressure pump 31a, which needs to be 100 W in Embodiment 1, can be reduced to 22.5 W in the present embodiment.

Moreover, when air conditioning is necessary even in the case where no electricity is generated in the gas turbine unit 2, that is, even in the case where it is unnecessary to combust the fuel, it is possible to stop unnecessary generation of the evaporated fuel by setting the ratio of the distribution by the distributing valve 33 so that 0% of the fuel is distributed to the combustion side and 100% of the fuel is distributed to the circulation side.

<Modification>

In Embodiment 2, the other end of the bleed air passage 4 is connected to the intermediate pressure position of the first compressor 21. In order to enhance the thermal efficiency of the gas turbine unit 2, it is effective to reduce the power of the first compressor 21. To realize this, it is preferable to extract the air being compressed in the first compressor 21 as the bleed air.

On the other hand, in order to lower further the temperature of the air discharged from the second expansion turbine 53 in the cooling fluid generator 5, it is preferable that the air discharged from the second compressor 51 has a high pressure. Thus, in the case where the cold air generating capacity of the cooling fluid generator 5 is considered to be more important than the thermal efficiency of the gas turbine unit 2, the compressed air in the first compressor 21 may be extracted as the bleed air. Specifically, as shown in FIG. 4, the other end (upstream end) of the bleed air passage 4 may be connected to a flow passage between the first compressor 21 and the regenerative heat exchanger 27.

In Embodiment 2, the fuel circulation passage 31 is provided with the fuel cooler 32, taking into account the heat transmissibility on the fuel side. However, in the case where the flow velocity of the fuel is high also in the fuel tank 30 because the circulation amount of the fuel is large, and the wind W generated by the travelling of the vehicle can be taken to the vicinity of the fuel tank 30, the fuel cooler 32 may be provided to the fuel tank 30 so as to cool the fuel held in the fuel tank 30 as shown in FIG. 5.

Figure 4:
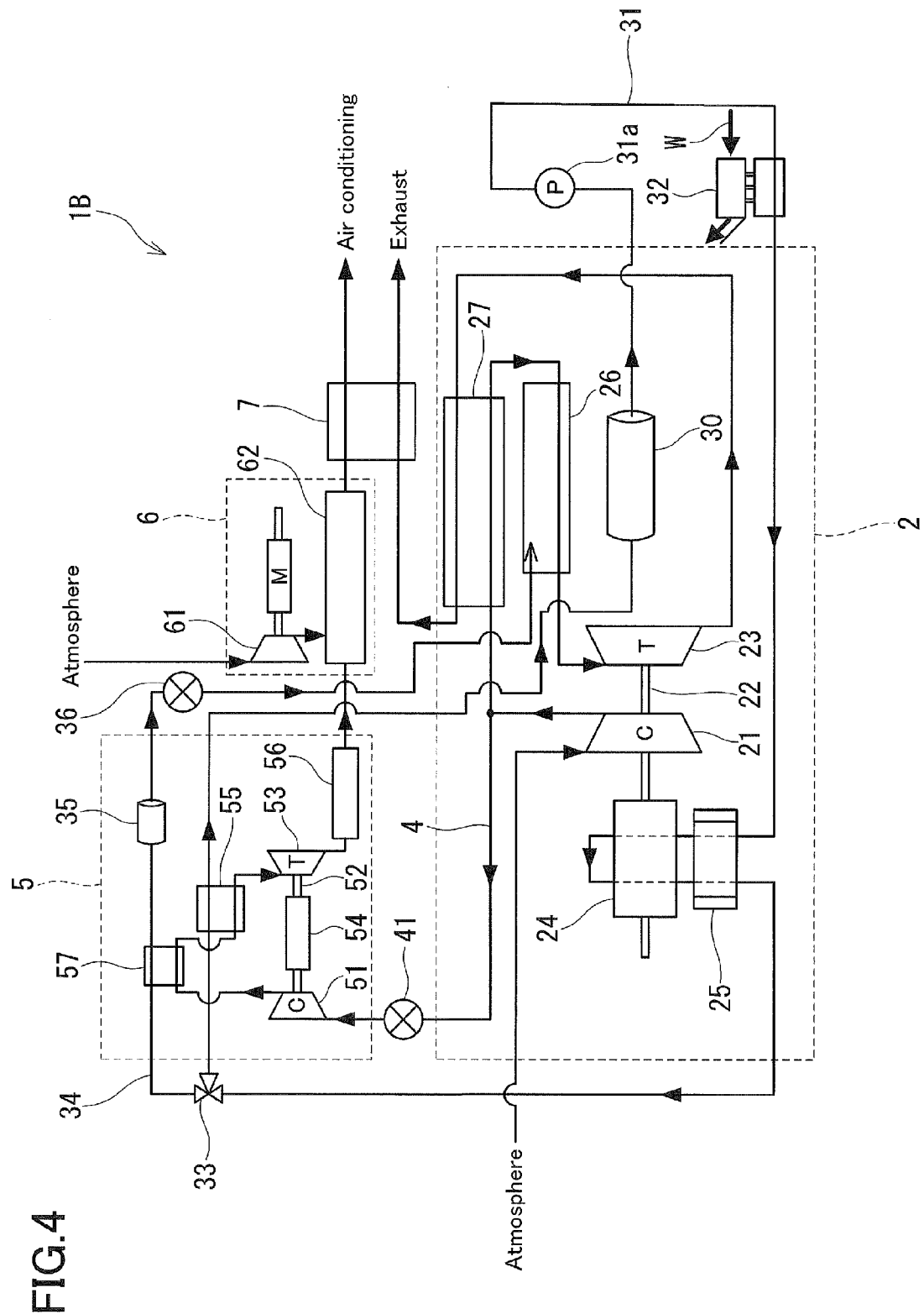
FIG. 4 is a configuration diagram of a modification of the gas turbine system.
Figure 5:
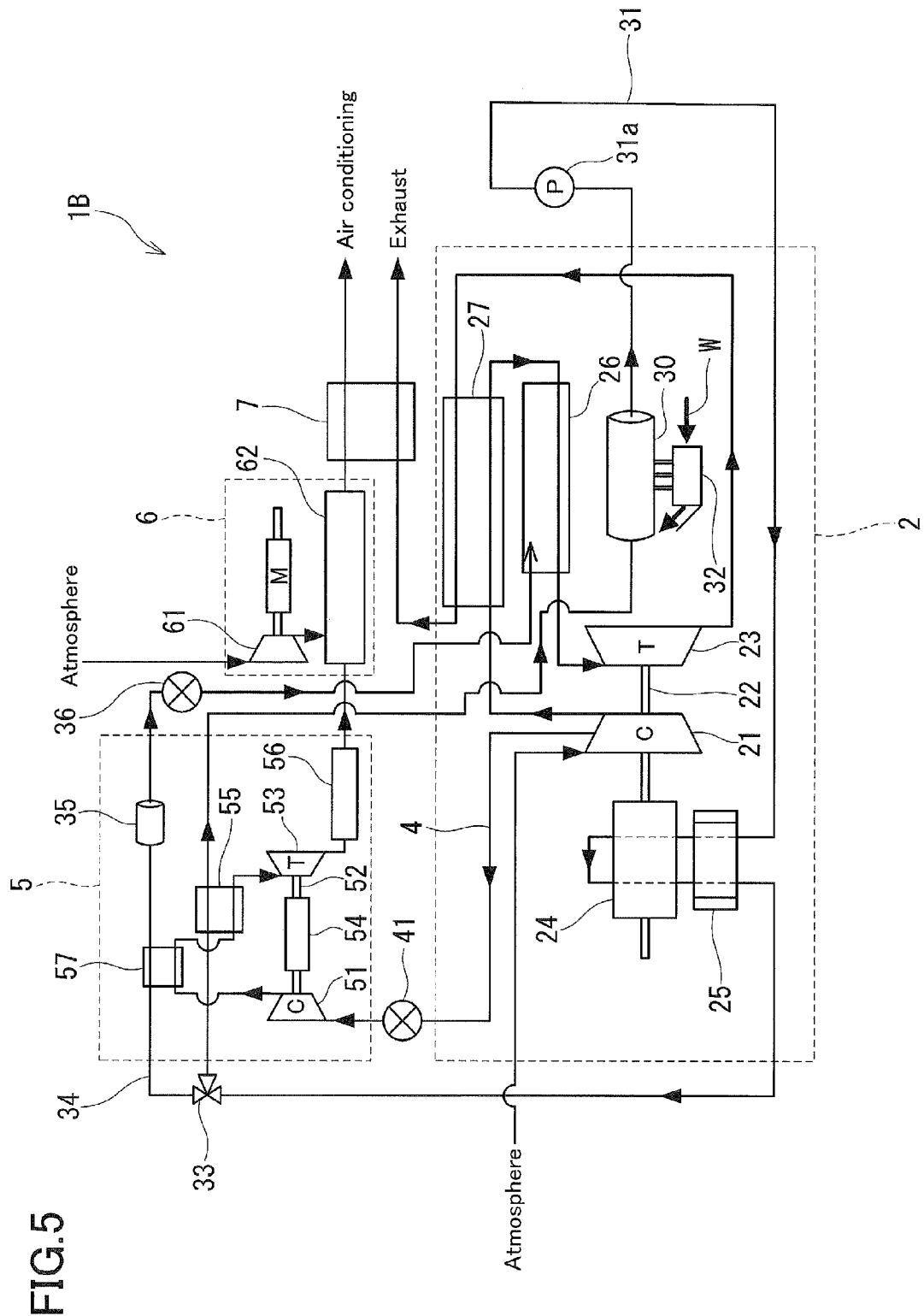
FIG. 5 is a configuration diagram of another modification of the gas turbine system.
Figure 6:
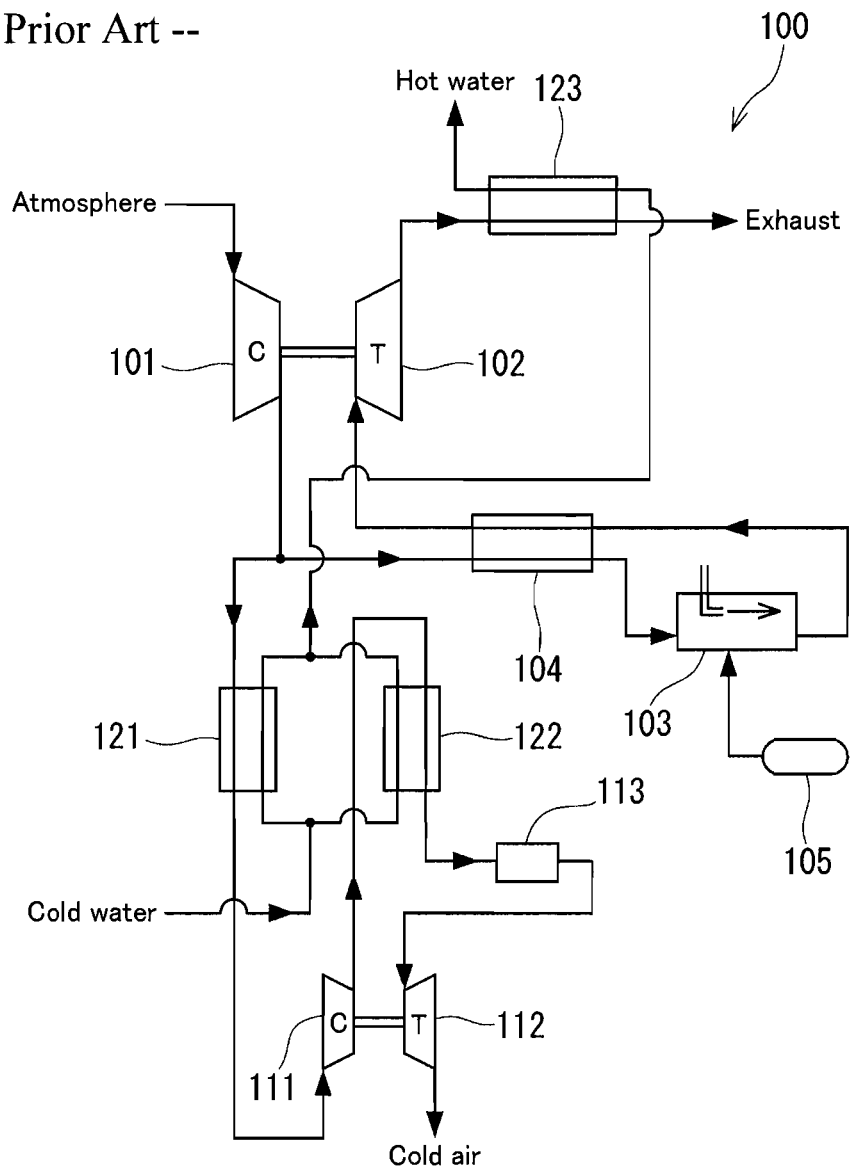
FIG. 6 is a configuration diagram of a conventional gas turbine system.

The modifications shown in FIG. 4 and FIG. 5 can be applied also to Embodiment 1.

Other Embodiments

Although the temperature of the air discharged from the second expansion turbine 53 is adjusted in the mixer 62 and the heat exchanger 7 in each gas turbine system 1A and 1B in Embodiments above, the temperature adjuster for controlling the temperature of the air discharged from the second expansion turbine 53 is not limited to this. For example, the temperature adjuster may be a configuration in which a bypass passage is provided to the bleed air passage 4 to mix the bleed air with the air discharged from the second expansion turbine 53.

It also is possible to omit the temperature adjuster and utilize directly, for an application such as refrigeration, the air discharged from the second expansion turbine 53. Alternatively, when the air is not used as the working fluid, it is possible to allow the working fluid discharged from the second expansion turbine 53 to flow into a heat exchanger for various applications.

Although the second expansion turbine 53 is coupled to the second compressor 51 by the second shaft 52 in Embodiments above, it also is possible to divide the second shaft 52 so that a motor is provided on the second compressor 51 side and the power generator is provided on the second expansion turbine 53 side of the second shaft 52, and rotate the second compressor 51 and the second expansion turbine 53 at appropriate rotation speeds, respectively.

Furthermore, it also is possible to omit the second compressor 51 when the pressure of the air extracted from the gas turbine unit 2 is sufficiently high. However, the presence of the second compressor 51 makes it possible to ensure a high expansion ratio in the second expansion turbine 53.

Moreover, although the fuel cooler 32 is configured to cool the fuel with the wind generated by the travelling of the vehicle in Embodiments above, the fuel cooler 32 may be, for example, a fan when the gas turbine systems 1A and 1B are not incorporated in vehicles.

The gas turbine systems 1A and 1B in Embodiments above can be downsized because they can generate cold energy as long as the working fluid exists besides the fuel. Therefore, the gas turbine systems 1A and 1B are not only suitable to be incorporated in vehicles but also useful as stationary gas turbine systems. The gas turbine unit 2 may not have the power generator 24 depending on the applications for which the gas turbine systems 1A and 1B are used.

The invention claimed is:

1. A gas turbine system with a cooling fluid generator comprising:
   a gas turbine unit comprising a first compressor for compressing a working fluid, a combustor in which a fuel is injected into the working fluid discharged from the first compressor so as to be combusted, a first expansion turbine for expanding a combustion gas generated in the combustor, the first expansion turbine being coupled to the first compressor by a first shaft, and a fuel tank for holding the fuel to be supplied to the combustor;
   a fuel circulation passage that allows the fuel held in the fuel tank to circulate therethrough; and
   the cooling fluid generator comprising a cooler for cooling, with the fuel flowing through the fuel circulation passage, the working fluid that has a pressure increased by the first compressor and that has been extracted from the gas turbine unit, and a second expansion turbine for expanding the working fluid that has flowed out of the cooler,
   wherein the cooling fluid generator further comprises a second compressor,
   wherein the first compressor and the cooler are connected via at least the second compressor,
   wherein the working fluid is air, and the gas turbine system further comprises a temperature adjuster for adjusting a temperature of the air discharged from the second expansion turbine, and
   wherein the gas turbine unit further comprises a regenerative heat exchanger for exchanging heat between the combustion gas discharged from the first expansion turbine and the air to flow into the combustor, and
   the temperature adjuster comprises a mixer for mixing the air discharged from the second expansion turbine with air taken from atmosphere, and
   a heat exchanger for exchanging heat between the air that has flowed out of the mixer and the combustion gas that has flowed out of the regenerative heat exchanger.

2. The gas turbine system with the cooling fluid generator according to claim 1, wherein the second compressor compresses the working fluid that has a pressure increased by the first compressor, before the working fluid flows into the cooler.

3. The gas turbine system with the cooling fluid generator according to claim 1, wherein the second expansion turbine is coupled to the second compressor by a second shaft.

4. The gas turbine system with the cooling fluid generator according to claim 1, wherein a liquid fuel is held in the fuel tank, the fuel circulation passage is provided with a branch passage that branches from the fuel circulation passage on an upstream side of the cooler and that reaches the combustor, and the cooling fluid generator further comprises a vaporizer for vaporizing the fuel flowing through the branch passage with the working fluid discharged from the second compressor.

5. The gas turbine system with the cooling fluid generator according to claim 4, wherein the branch passage is provided, on a downstream side of the vaporizer, with a pressure accumulator.

6. The gas turbine system with the cooling fluid generator according to claim 1, wherein the cooling fluid generator further comprises a moisture separator for separating moisture from the working fluid discharged from the second expansion turbine.

7. The gas turbine system with the cooling fluid generator according to claim 1, further comprising a fuel cooler for cooling the fuel held in the fuel tank or the fuel flowing through the fuel circulation passage.

8. The gas turbine system with the cooling fluid generator according to claim 7, wherein the gas turbine system is to be incorporated in a vehicle, and the fuel cooler cools the fuel with wind generated by travelling of the vehicle.

9. The gas turbine system with the cooling fluid generator according to claim 1, wherein the gas turbine unit further comprises a power generator coupled to the first shaft.

10. The gas turbine system with the cooling fluid generator according to claim 9, wherein the fuel circulation passage is configured to pass through the power generator.

11. The gas turbine system with the cooling fluid generator according to claim 1, wherein the fuel circulation passage is connected to the tank and passes through the cooler.

12. The gas turbine system with the cooling fluid generator according to claim 1, wherein both ends of the fuel circulation passage are connected to the fuel tank.

13. The gas turbine system with the cooling fluid generator according to claim 1, wherein a flow path that allows the working fluid to flow therethrough is formed, and the flow path passes through the first compressor, the second compressor, the cooler and the second expansion turbine in this order.

14. A gas turbine system with the cooling fluid generator comprising:
   a gas turbine unit comprising a first compressor for compressing a working fluid, a combustor in which a fuel is injected into the working fluid discharged from the first compressor so as to be combusted, a first expansion turbine for expanding a combustion gas generated in the combustor, the first expansion turbine being coupled to the first compressor by a first shaft, and a fuel tank for holding the fuel to be supplied to the combustor;
   a fuel circulation passage that allows the fuel held in the fuel tank to circulate therethrough; and
   the cooling fluid generator comprising a cooler for cooling, with the fuel flowing through the fuel circulation passage, the working fluid that has a pressure increased by the first compressor and that has been extracted from the gas turbine unit, and a second expansion turbine for expanding the working fluid that has flowed out of the cooler, wherein
   the working fluid is air,
   the gas turbine system further comprises a temperature adjuster for adjusting a temperature of the air discharged from the second expansion turbine,
   the gas turbine unit further comprises a regenerative heat exchanger for exchanging heat between the combustion gas discharged from the first expansion turbine and the air to flow into the combustor, and the temperature adjuster comprises a mixer for mixing the air discharged from the second expansion turbine with air taken from atmosphere, and a heat exchanger for exchanging heat between the air that has flowed out of the mixer and the combustion gas that has flowed out of the regenerative heat exchanger.

\* \* \* \* \*